Figure 1:
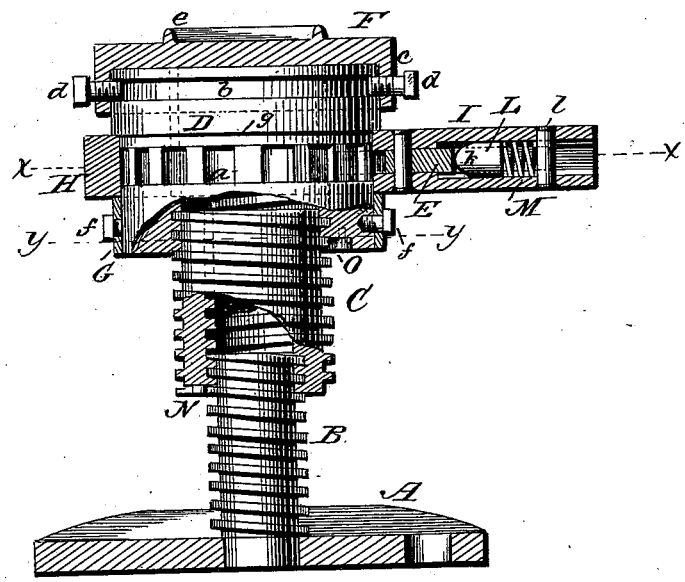

(No Model.)

J. G. RIEFF & P. KINDLEN.
JACK SCREW.

No. 560,933. Patented May 26, 1896.

WITNESSES
C. J. Williamson.
M. J. Cummings.

INVENTORS
John G. Rieff,
Perl Kindlen.
per Chas. H. Fowler,
Attorney

UNITED STATES PATENT OFFICE.

JOHN G. RIEFF AND PERL KINDLEN, OF LONDON, WISCONSIN.

JACK-SCREW.

SPECIFICATION forming part of Letters Patent No. 560,933, dated May 26, 1896.

Application filed April 2, 1896. Serial No. 586,011. (No model.)

*To all whom it may concern:*

Be it known that we, JOHN G. RIEFF and PERL KINDLEN, citizens of the United States, residing at London, in the county of Dane and State of Wisconsin, have invented certain new and useful Improvements in Jack-Screws; and we do hereby declare that the following is a full, clear, and exact description of the same, reference being had to the annexed drawings, making a part of this specification, and to the letters of reference marked thereon.

The present invention has for its object to provide a jack-screw that will possess the necessary strength and durability as well as an effective power in raising heavy bodies of any character, and for other purposes in which a device of similar kind would be found useful.

The invention consists in a jack-screw constructed substantially as shown in the drawings and hereinafter described and claimed.

Figure 2:
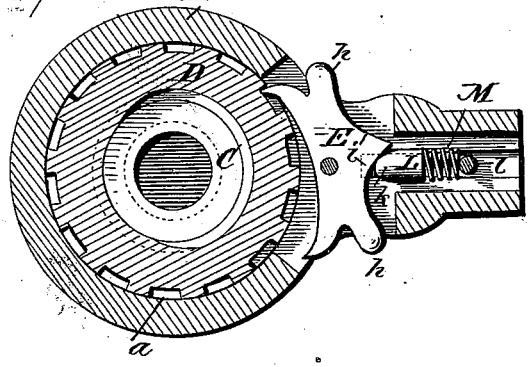
Figure 3:
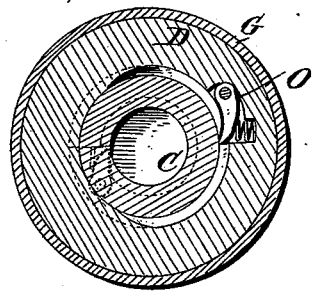

Figure 1 of the drawings represents a part-sectional elevation of a jack-screw constructed in accordance with our invention; Fig. 2, a horizontal section thereof, taken on line $xx$; Fig. 3, a similar view taken on line $yy$.

In the accompanying drawings, A represents the base or support of the jack-screw, to which is secured the exterior screw-post B, the threads thereof engaging the threads upon the interior of a cylinder C. This cylinder has exterior screw-threads to engage the interior screw-threads upon a tubular head D, which head has a notched periphery $a$, and engaging therewith is a double-ended dog E. The upper portion of the head D has a circumferential groove $b$, and over the head is a cap F, held thereon by means of set-screws $d$, whereby the cap is enabled to turn upon the head to adapt itself to weight being supported, but cannot be detached without disengaging the screws with the groove. The downwardly-projecting flange $c$ of the cap F embraces the head D, and through this flange the screws $d$ extend, and a supporting-flange $e$ of circular form is provided upon the upper side of the cap to decrease the frictional bearing-surface of the cap when any object is resting thereon. The shoulder $g$ upon the head D and a detachable band G holds upon the head a movable ring H, said band being retained upon the head by means of set-screws $f$. The ring H is on line with the notched periphery $a$ of the head D and is provided with a tubular extension I for connecting thereto a suitable hand-lever for operating or turning the ring. Within the tubular extension I is pivotally connected a double-ended dog E, which dog is especially constructed for operation with a jack-screw of the character herein described.

The double-ended dog E is provided with knobs $h$ for convenience in handling the dog to throw it from one side to the other to bring either one or the other of the dogs into action and engagement with the notched periphery $a$ of the head D. This dog has a double-bearing cam $i$, with which engages a spring-actuated key L, the rounded end $k$ thereof bearing against one of the faces of the double cam. This key or locking device is retained against the bearing-surface of the cam by means of a coil-spring M, its ends bearing, respectively, against the key and a pin $l$, passing through the tubular extension I.

Spring-actuated pawls N O upon the cylinder C and head D, respectively, hold the screw-threaded portions of the jack-screw together and prevent them from being disconnected when extended its greatest limit.

A very practical and easily-operating jack-screw is provided, when constructed as herein described, in which its superior lifting power will enable it to be used for various purposes as a powerful lever, and it being compact and simple in its parts the liability of its easily becoming out of order is materially lessened.

Having now fully described our invention, what we claim as new, and desire to secure by Letters Patent, is—

A jack-screw consisting of a suitable base and an exterior screw-threaded post projecting therefrom, a head having interior screw-threads, a notched periphery and formed with a circumferential shoulder, an interiorly and exteriorly screw-threaded cylinder engaging with the post and head, spring-actuated pawls upon the head and cylinder respectively, a ring loosely fitting around the notched periphery of the head and held thereon by a detachable band, a tubular extension upon the ring, a double-headed pawl pivotally connected thereto and having double concave cams and a laterally-projecting knob upon each side of the dog to serve as handles, and a spring-actuated key acting in connection with the cams upon the dog, substantially as and for the purpose set forth.

In testimony that we claim the above we have hereunto subscribed our names in the presence of two witnesses.

JOHN G. RIEFF.
PERL KINDLEN.

Witnesses:
CHAS. E. BUELL,
M. L. FOWLER.